No. 839,274. PATENTED DEC. 25, 1906.
A. T. DAWSON & J. HORNE.
RANGE INDICATOR FOR ORDNANCE.
APPLICATION FILED DEC. 12, 1905.
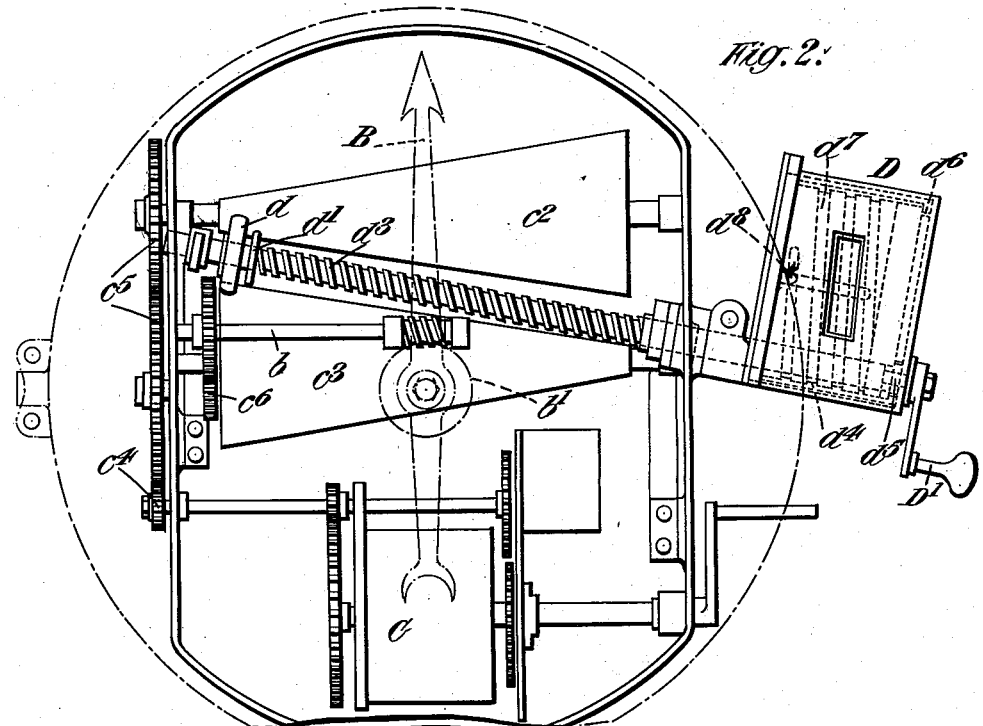
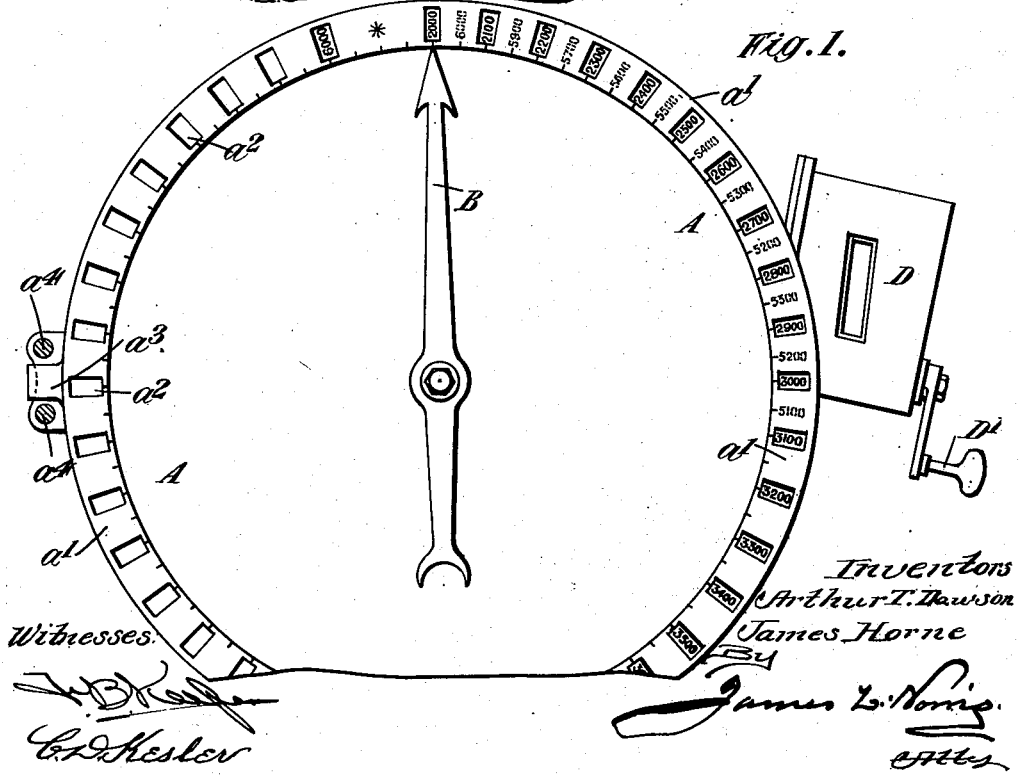

UNITED STATES PATENT OFFICE.

ARTHUR TREVOR DAWSON, OF WESTMINSTER, AND JAMES HORNE, OF BARROW-IN-FURNESS, ENGLAND, ASSIGNORS TO VICKERS SONS & MAXIM LIMITED, OF WESTMINSTER, ENGLAND.

RANGE-INDICATOR FOR ORDNANCE.

No. 839,274.          Specification of Letters Patent.          Patented Dec. 25, 1906.

Original application filed March 15, 1905, Serial No. 250,308. Divided and this application filed December 12, 1905. Serial No. 291,437.

*To all whom it may concern:*

Be it known that we, ARTHUR TREVOR DAWSON, lieutenant of the Royal Navy, director and superintendent of Ordnance Works, residing at 32 Victoria street, Westminster, in the county of London, and JAMES HORNE, engineer, residing at Vickers Sons & Maxim Limited Naval Construction Works, Barrow-in-Furness, in the county of Lancaster, England, subjects of the King of Great Britain, have invented certain new and useful Improvements Relating to Range-Indicators for Ordnance, of which the following is a specification.

This invention relates to apparatus for indicating the variations of range or distance between a gun and its target in cases where either or both are subject to changes of position affecting such range or distance, such apparatus being so constructed that it will automatically indicate to those in charge of a gun or guns in ships or other naval structures the necessary information relating to variations in the range or distance due to the relative movements of such ships or structures and the targets. In apparatus of this kind we have employed a graduated dial and a pointer, either of which is actuated by clockwork or other mechanism capable of imparting thereto an automatic movement which will be constant at any particular speed to which the apparatus is set by the operator. By observing the relative speed or change of position between the target and the gun the operator can ascertain what change of speed or direction of the pointer is necessary to keep the same in correspondence with the alterations in the range or distance of the gun from the target. The apparatus is adapted to be adjusted by the operator to bring any particular graduation on the dial opposite the pointer, and thereby initially "set" the apparatus—*i. e.*, indicate in yards or otherwise the distance corresponding to the range at that instant of time. The speed or rate at which the range varies is then observed and the apparatus adjusted by the operator so as to work in correspondence with such speed, this setting being effected by suitable mechanism controlled by a handle or the like and furnished with appropriate graduations or figures for indicating the speed in knots per hour or otherwise. Apparatus of this kind forms the subject of another application for patent filed by us on the 15th of March, 1905, Serial No. 250,308, and the present invention relates to the graduated dial and its pointer; and it consists in the employment of two series of graduations, one series indicating increasing range and the other series indicating decreasing range, and of an angularly-displaceable shutter having near its periphery apertures which, according to the angular setting of said shutter, will expose one or other of the said series of graduations, so that the direction of travel of the pointer need not be reversed when the readings are to be changed from increasing to decreasing range, and vice versa.

In the accompanying drawings, Figure 1 is a front elevation of an apparatus of the kind to which this invention applies provided with the double-graduated dial and its angularly-displaceable perforated shutter. Fig. 2 is a similar view with the dial removed in order to expose the internal mechanism.

A is the graduated dial; B, the pointer; C, the clock-movement, and D the casing inclosing the mechanism for setting the speed at which the instrument works relatively to the speed at which the range is changing. The speed of movement of the pointer B is varied by the position of a friction-roller $d$ relatively to a pair of conical rollers $c^2$ $c^3$. One of the conical rollers—viz., $c^2$—is driven at a constant speed from the clock-movement C through the toothed pinion $c^4$ and toothed wheels $c^5$, the movement being transmitted from this conical roller $c^2$, through the friction-roller $d$, to the other conical roller $c^3$. The latter is connected by a train of toothed wheels $c^6$ to the worm-spindle $b$ and thence through the worm-wheel $b'$ to the pointer B. The friction-roller $d$ rotates on a sleeve $d'$, formed on a frame or cross-head through which the traversing screw $d^3$ passes and engages with a screw-nut of the said cross-head, so as to traverse the latter without revolving the roller $d$, as was fully explained in our said prior specification. The said screw-spindle $d^3$ is prolonged through the casing D and furnished with a handle $D'$ for actuating it, the rotary and traversing speed-indicating drum $d^4$ being operated from said spindle through a pinion $d^5$, teeth $d^6$, spiral groove $d^7$, and a stationary pin $d^8$, as in the arrangement already described in our said prior specification.

The graduated dial A is provided with the shutter $a'$, which is in the form of an angularly-displaceable disk or ring having a series of apertures or perforations $a^2$ near its periphery, through which, in accordance with the position of the perforated disk or ring, one or other of the two series of graduations will be exposed, one series comprising the graduations for increasing range and the other series comprising the graduations for the decreasing range. The said disk or ring has its axis of displacement coincident with that of the dial A, and it has a lug or handle $a^3$, that lies between fixed stops $a^4$, which latter are so arranged as to limit the extent of the ring's movement and insure its bringing its apertures into proper register with the graduations on the dial when moved into either of its extreme positions.

What we claim, and desire to secure by Letters Patent of the United States, is—

1. In a variable-range-indicating apparatus, the combination with a normally stationary dial bearing two series of range indications reading in opposite directions, an index or pointer movable around said dial, a clock-movement driving said index or pointer, and an adjustable device for transmitting motion from the clock-movement to the index or pointer; of means for bringing one or other of said series of range indications into coöperative relationship with the index or pointer substantially as described.

2. In a variable-range-indicating apparatus, the combination with a normally stationary dial bearing two series of range indications reading in opposite directions, an index or pointer movable around said dial, a clock-movement driving said index or pointer, and an adjustable device for transmitting motion from the clock-movement to the index or pointer; of means for exposing either of said series of range indications and hiding the other series substantially as described.

3. In a variable-range-indicating apparatus, the combination with a normally stationary dial bearing two series of range indications reading in opposite directions, an index or pointer movable around said dial, a clock-movement driving said index or pointer, and an adjustable device for transmitting motion from the clock-movement to the index or pointer; of a perforated shutter angularly displaceable to a limited extent about the axis of the dial, for exposing either of said series of range indications and hiding the other series substantially as described.

4. In a variable-range-indicating apparatus, the combination with a normally stationary dial bearing two series of range indications reading in opposite directions, an index or pointer movable around said dial, a clock-movement driving said index or pointer and an adjustable device for transmitting motion from the clock-movement to the index or pointer; of a perforated ring angularly displaceable about the axis of the dial, means for shifting the shutter, and means for limiting its movement in order to render one or other of the series of range indications visible through its perforations substantially as described.

In testimony whereof we have hereunto set our hands, in presence of two subscribing witnesses, this 23d and 25th days of November, 1905.

ARTHUR TREVOR DAWSON.
JAMES HORNE.

Witnesses to the signature of Arthur Trevor Dawson:
HENRY KING,
ALFRED PEAKS.

Witnesses to the signature of James Horne:
W. H. ATKINSON,
HAROLD G. JAMES.